(12) United States Patent
Woundy et al.

(10) Patent No.: US 7,415,603 B2
(45) Date of Patent: Aug. 19, 2008

(54) METHOD AND SYSTEM OF CONFIGURING MEDIA UNITS FROM DIFFERENT VENDORS USING A SINGLE BULK CONFIGURATION FILE

(75) Inventors: Richard Woundy, North Reading, MA (US); John G. Bevilacqua, Boulder, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 255 days.

(21) Appl. No.: 11/136,049

(22) Filed: May 24, 2005

(65) Prior Publication Data

US 2006/0271772 A1   Nov. 30, 2006

(51) Int. Cl.
*G06F 9/00* (2006.01)
*G06F 15/177* (2006.01)

(52) U.S. Cl. ............................ 713/1; 713/100; 717/171
(58) Field of Classification Search .................... 713/1, 713/2, 100; 717/171
See application file for complete search history.

(56) References Cited

U.S. PATENT DOCUMENTS

| | | | |
|---|---|---|---|
| 6,484,315 B1 * | 11/2002 | Ziese ........................ 717/173 |
| 6,718,374 B1 * | 4/2004 | Del Sordo et al. ............ 709/220 |
| 7,069,452 B1 * | 6/2006 | Hind et al. ...................... 713/1 |
| 7,194,756 B2 * | 3/2007 | Addington et al. ........... 725/116 |
| 7,287,257 B2 | 10/2007 | Meza |
| 2002/0071440 A1 | 6/2002 | Cerami et al. |
| 2003/0048380 A1 | 3/2003 | Tamura |
| 2004/0031052 A1 * | 2/2004 | Wannamaker et al. .......... 725/61 |
| 2005/0076394 A1 * | 4/2005 | Watson et al. ................ 725/151 |
| 2005/0228877 A1 | 10/2005 | Monitzer et al. |
| 2006/0026655 A1 * | 2/2006 | Perez ........................... 725/91 |

OTHER PUBLICATIONS

Notice of References cited from U.S. Appl. No. 10/570,832, mailed Feb. 21, 2008, 1 page.

* cited by examiner

*Primary Examiner*—Mark Connolly
(74) *Attorney, Agent, or Firm*—Brooks Kushman P.C.

(57) ABSTRACT

A method and system of configuring media units. The method and system may include a bulk configuration file having instructions for configuring the media units. The bulk configuration file include instructions to support configuring media units provided by different vendors or otherwise requiring different configurations. The bulk configuration file may be transmitted to one or more of the media units, such as through a unicast or multicast operation.

19 Claims, 2 Drawing Sheets

METHOD AND SYSTEM OF CONFIGURING MEDIA UNITS FROM DIFFERENT VENDORS USING A SINGLE BULK CONFIGURATION FILE

BACKGROUND OF THE INVENTION

1. Field of the Invention

The present invention relates to methods and systems of configuring media units.

2. Background Art

Media providers, such as cable/satellite television, high-speed data, and other servers providers, typically deploy one or more media units to facilitate extending services to their customers. The media units may be transmission related features, such as routers, bridges, hubs, Cable Modem Termination Systems (CMTS), network provisioning units (NPUs), conditional access routers (CARs), and the like. The media units may also be customer related or customer premises equipment, such as settop boxes (STBs), cable modems (CMs), computers, digital or personal video recorders (DVRs, PVRs), media terminal adapters (MTAs), outlet digital adapters (ODAs), and the like.

The use of these and other media units may be dependent on the services provided and the features required to support the operation thereof. The media providers face numerous challenges in supporting systems having such features. Cable providers, for example, may be required to support millions of media units. The support thereof may include monitoring performance, troubleshooting problems and/or malfunctions, installation, configurations etc.

One difficultly with supporting the media units in this manner is that the media providers may be faced with configuring media units from different vendors. For example, in the cable environment, a cable service provider may provide services to STBs of a number of different vendors. Configuring such STBs can be problematic, as each STB may operate according to different protocols and/or procedures.

SUMMARY OF THE INVENTION

One aspect of the present invention relates to a method of configuring media units wherein a number of the media units have different configuration requirements. The method may include providing a bulk configuration file having instructions for configuring the media units and transporting the bulk configuration file to the media units from a network element. Optionally, the method may include including instructions within the bulk configuration file for configuring each of the media units according to the different configuration requirements associated therewith.

The method may include configuring the media units to request the bulk configuration file from the network element and to self-configure upon receipt of the configuration file.

The method may include associating the instructions within the bulk configuration file with indicators associated with the different configuration requirements, and configuring the media units to parse the instructions of the bulk configuration file as a function of the indicators included therein. The method may include configuring the media units to only self-configure as a function of the parsed configuration instructions. The method may include including identifiers on the media units for use in parsing the instructions.

The method may include periodically broadcasting the bulk configuration file to the media units and including instructions therein to configure the media units to periodically check for updates to the bulk configuration file.

The method may include including instructions within the bulk configuration file to facilitate remote control of the media units.

The method may include transporting the bulk configuration file according to DOCSIS, DSG, or TFTP protocols.

One aspect of the present invention relates to an electronic system of providing electronic services to customers. The services may be provided over an electronic network and with the assistance of a number of media units. The system may include a bulk configuration file having instructions for configuring the media units and a network element having network communication capabilities.

The system may include the bulk configuration file having instructions for configuring each of the media units according to different configuration requirements associated therewith. The system may include the network element transporting the bulk configuration file to the media units.

The system may include at least a portion of the media units being settop boxes (STBs). The system may include the network element being configured to transport the bulk configuration file according to DOCSIS, DSG, or TFTP protocols. The system may include network element being a network provisioning unit (NPU).

One aspect of the present invention relates to a method of configuring multiple settop boxes (STBs) wherein a number of the STBs have different configuration requirements. The method may include providing a bulk configuration file having instructions for configuring the STBs according to the different configuration requirements associated therewith, and transporting the bulk configuration file to the STBs from a network element.

The method may include configuring the STBs to request the bulk configuration file from the network element and to self-configure upon receipt of the configuration file.

The method may include associating the instructions within the bulk configuration file with indicators associated with the different STB configuration requirements, and configuring the STBs to parse the instructions of the bulk configuration file as a function of the indicators included therein.

The method may include including event logging instructions within the bulk configuration file. For example, the event logging instructions may include parameters associated logging data as a function of STB events. The method may include including instructions for configuring remote management of the STBs.

The method may include instructing the STBs to transmit the logged data to the network element.

The above features and advantages, along with other features and advantages of the present invention, are readily apparent from the following detailed description of the invention when taken in connection with the accompanying drawings.

BRIEF DESCRIPTION OF THE DRAWINGS

FIG. 4 illustrates a flowchart of a method of configuring the media units in accordance with one non-limiting aspect of the present invention

DETAILED DESCRIPTION OF THE PREFERRED EMBODIMENT(S)

Figure 1:
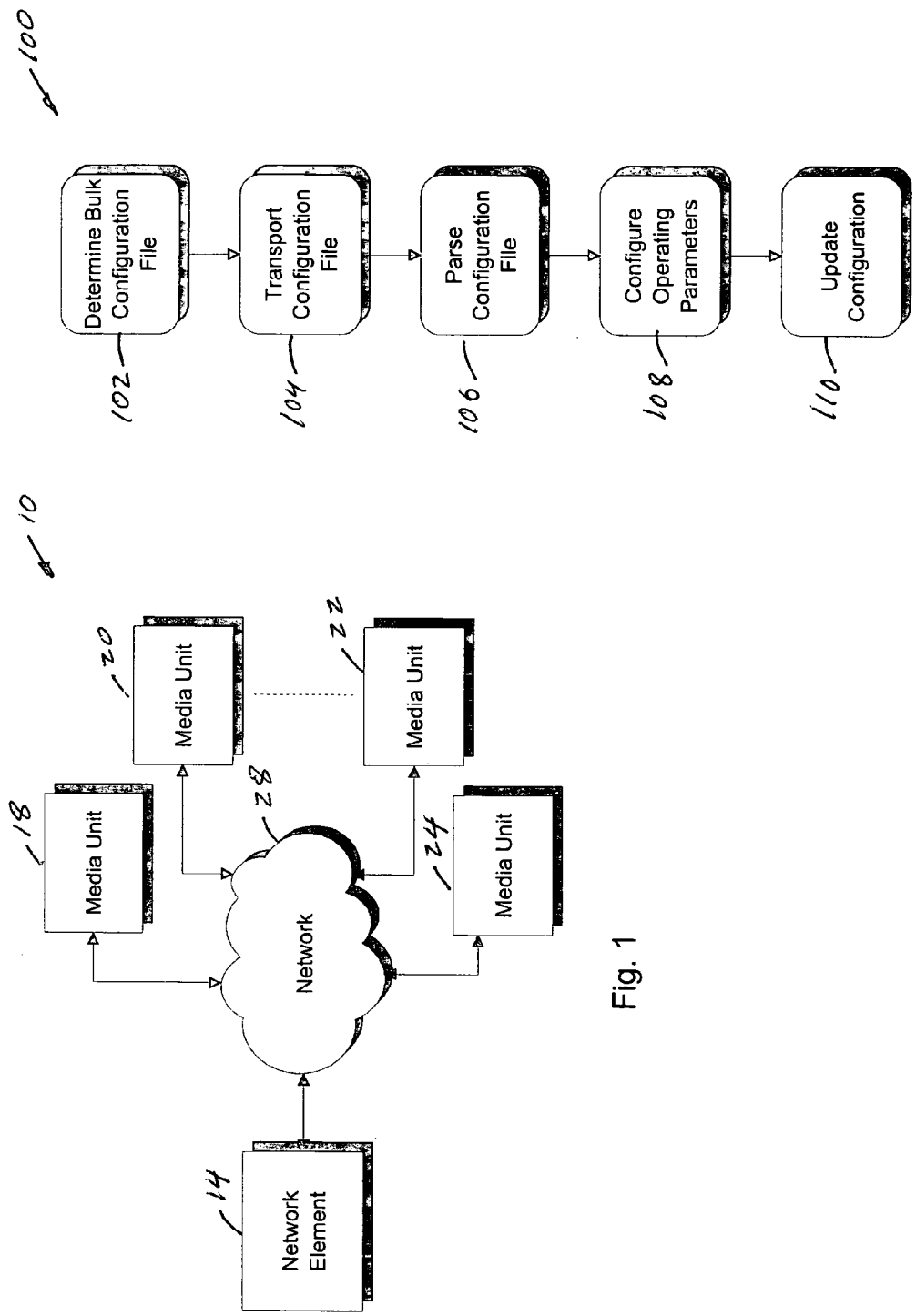
FIG. 1 illustrates a system of providing services to one or more customers in accordance with one non-limiting aspect of the present invention.

FIG. 1 illustrates a system 10 of providing services to one or more customers in accordance with one non-limiting aspect of the present invention. The system 10 may include a network element 14 which communicates with a number of media units 18-24 through a network 28. For example, the system 10 may be configured to support cable television operations where the network element 14 may be a headend unit or other feature associated with a cable operator which communicates with media units 18-24 which provide or facilitate services between the cable operator and one or more customers.

The network element 14 may include a number of features associated with providing services to the customers. The network element 14 may be associated with a cable system, satellite system, or other system associated with providing services to the customers. It may include any number of processors, memories, user interfaces, and other features to facilitate the operation thereof. The network element 14 may be programmed and controlled to perform any number operations and functions associated with providing any number of services to the customers.

The media units 18-24 may include any number of devices and elements associated with supporting the services provided by the network element. For example, the media units may be settop boxes (STBs), modems, cable modems (CMs), computers, digital or personal video recorders (DVRs, PVRs), media terminal adapters (MTAs), outlet digital adapters (ODAs), cable modem termination systems (CMTSs), network provisioning units (NPUs), conditional access routers (CARs), and others.

The network 28 may include any number of features and options to support signal communications between the network element 14 and the media units 18-24. The network 28 may include terrestrial and extraterrestrial components and infrastructures. It may include cable lines, telephone lines, and/or satellite or other wireless architectures. The network 28 may be associated with other private and/or public networks, such as the Internet and provider specific private networks.

The network element 14, network 28 and/or media units 18-24 may be configured to operate according to or support the operation of any number of protocols, applications, and procedures, including applications such as linear and non-linear television programming (cable, satellite, broadcast, etc.), Video on Demand (VOD), interactive television (iTV), interactive gaming, pay-per-view (PPV), and protocols such as, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

Figure 2:
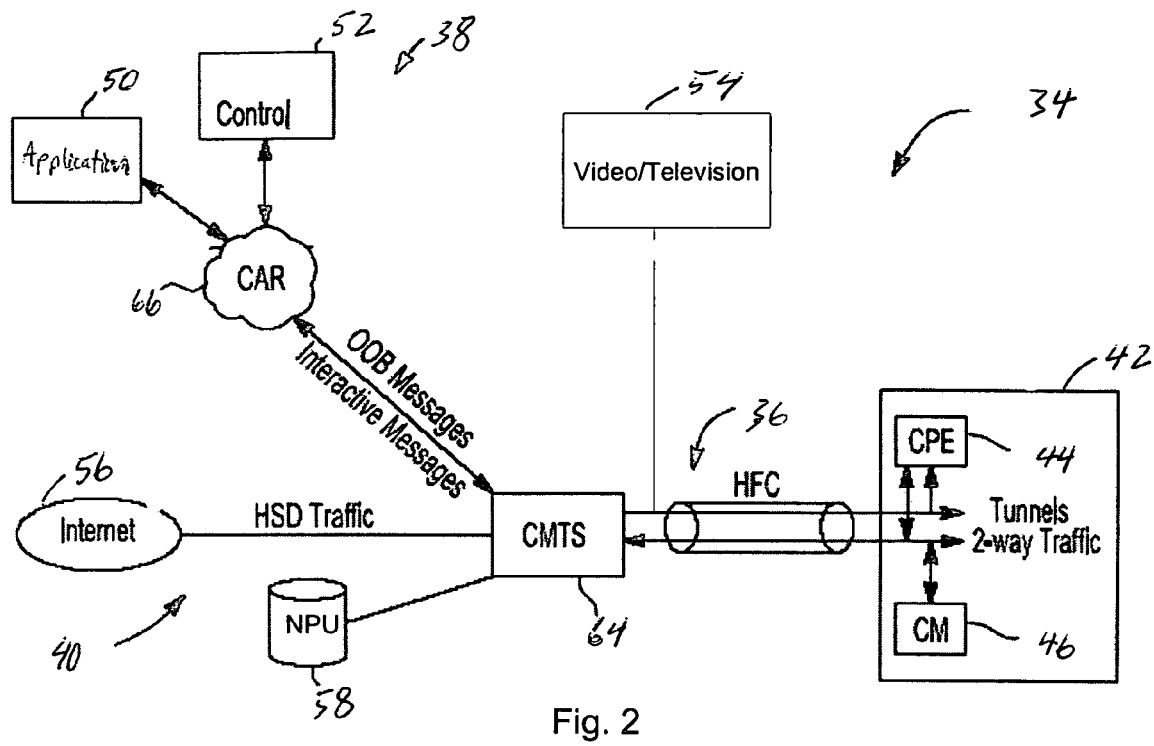
FIG. 2 illustrates an exemplary cable system in accordance with one non-limiting aspect of the present invention.

FIG. 2 illustrates an exemplary cable system 34 in accordance with one non-limiting aspect of the present invention. The system 34 may include a management/application portion 38 and a High Speed Data (HSD) portion 40 that respectively provide management/application and HSD services over a hybrid fiber coax (HFC) 36, or other communication medium, to a subscriber station 42.

The subscriber station may include any number of media units, including customer premises equipment (CPE) 44 and a cable modem (CM) 46. The subscriber station 42 generally relates to all features, devices, and applications located at a customer location which interface with one or both of the media provider and/or customer to support media services associated with the cable system provider. Multiple subscriber stations having any number of features and devices may be supported through signals communicated over the HFC network.

The management/application portion 38 may include an application portion 50, a control portion 52, and a video/television portion 54. The control portion 52 may include features to facilitate controlling, provisioning, managing, and securing the CPE 44 through OOB messaging and other protocols. The application portion 50 may include features associated with providing applications to the CPE 44, such as VOD, iTV, and other services. The video/television portion 54 may cooperate with the application portion 50 and control portion 52 to support video operations associated therewith and/or it may act independently to provide television, music, video, and other multimedia services to the CPE 44.

The HSD network 40 may provide data services for the system 34, including services for the CM 46 to access the Internet 56. It may include a network element, such as a network provisioning unit (NPU) 58. The NPU 58 may be configured to support any number of activities associated with the media units. In accordance with one non-limiting aspect of the present invention, the NPU 58 may include capabilities to facilitate configuring the media units, such as by distributing bulk configurations files to one or more the media units. It may be configured to communicate with the media units through any number of protocols, applications, and communication mediums, including DHCP, HTTP, SNMP, TFTP, and the like.

In addition to the media units at the subscriber station 42, one of the transmission related media units may be a CMTS 64. The CMTS 64 may be configured to send and receive signals over the HFC network 58, such as between the Internet 56 and the CPE 44 and the CM 46. In general, the CMTS 64 transfers IP packets from the HSD network 40 and the management/application network 38 to the CPE 44 and CM 46 for processing. Preferably, the signals are outputted from the CMTS 64 on downstream output channels, which may include one-way output data tunnels, such as for OOB messaging. In addition, the CMTS 64 may be configured to receive signals from the CPE 44 and the CM 46 to support two-way communication therewith, such as for transfer of IP packets from the STB and/or the CM to the Internet 56 and/or the management/application network 38.

Another one of the transmission related media units may be a CAR 66. The CAR 66 may be configured to connect the management network 38 to the CMTS 64. The CAR 66 may transport signals therebetween using IP protocols, and optionally, it may provide firewall separation for the VOD or STB controller portions and from the HSD network 38, enhancing security from any devices attempting to associate with devices and signaling on the management network. In operation, signaling traffic transported between the management network 38 and the CMTS 64 may be wrapped into addressable packets, such as Ethernet, IP, or other packets.

Figure 3:
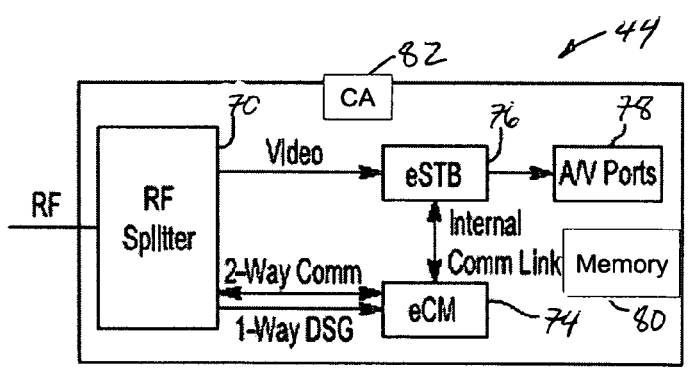
FIG. 3 illustrates a media unit in accordance with one aspect of the present invention.

FIG. 3 illustrates the CPE 44 in accordance with one aspect of the present invention. The CPE 44 may be configured to communicate with the CMTS 64 through digital cable signals, such as through signaling defined by DOCSIS, DSG, and/or through other protocols authorized through DHCP registration. The CPE 44 may include a radio frequency (RF) splitter 70, an embedded cable modem (eCM) 74, am embedded settop box (eSTB) 76, audio visual (A/V) ports 78, a memory (volatile and/or non-volatile) 80, and an optional conditional access (CA) unit 82.

The RF splitter 70 may be configured to split RF signals into two portions—one for OOB control functions and two-way application traffic and one for video delivery. The OOB and two-way application traffic may be relayed to the eCM 74 and the video may be separately relayed to the eSTB 76. The eSTB 76 may be configured to manipulate signals and output video and other media signals to a media output device (not shown) or other device connected to the A/V ports 78, such as to a television (TV), digital video recorder (DVR), personal video recorder (PVR), or the like.

The eCM 74 may be configured to process and control other signals, such as DOCSIS and other IP packets, and bridge or relay the signals to the eSTB 76 through an internal communications link. The communications link may be used to transfer signals received through data tunnels, such as those tuned to by the eCM 74 to the eSTB 76, so that OOB messaging signals associated therewith can be delivered to the eSTB 76 for processing. The eCM 74 may include network communication capabilities for bi-directional communication of data signals with the CMTS 64.

The CA unit 82 may be configured to provide conditional access control for the CPE 44. It can be a CableCard, Smart-Card, or other item for controlling security and access to the data, video, and control signals transmitted over the HFC 36. It is illustrated as a standalone item, however, it can be included with or embedded on the eSTB 76 or the eCM 74 to perform similar functions.

The eCM 74, eSTB 76, and CA unit 82 may be logically separate entities, however, they may physically share hardware and software. Other items, such as control logic and applications may be included on the CPE 44 for controlling operation of the eSTB 76 and/or the eCM 74.

Of course, the foregoing is merely provided for exemplary purposes and is intended to disclose only a portion of the devices, applications, and configurations which may be used with the network element and media units to provide and/or support customer services. The present fully contemplates any number of configurations and configurations including more or less of the foregoing features.

FIG. 4 illustrates a flowchart 100 of a method of configuring the media units in accordance with one non-limiting aspect of the present invention. The method generally relates to one or more network elements transporting a bulk configuration file to one or more of the media units. The bulk configuration file may include instructions to facilitate configuring the one or more media units. As described above, the present invention fully contemplates applying the methods of the present invention in any number of environments.

Block 102 relates to determining a bulk configuration file. The bulk configuration file may include instructions associated with one or more of the media units. The instructions may be selected to facilitate configuring operation of the media units, such as by specifying operational parameters and other features associated with controlling and configuring the operation thereof.

The instructions may correspond with configuration settings and procedures of the media units and protocols associated therewith. Accordingly, the present invention contemplates generating the instructions according to any number of specifications, protocols, formats, platforms, and the like. In addition, the bulk configuration file may include multiple sets of instructions for multiple media units.

The instructions within the bulk configuration file may be associated with indicators or other identifiers. The indicators may be cross-referenced with vendors, model numbers, and other parameters of the media units. As described below in more detail, the media units may be configured to recognize the indicators and to locate the instructions associated therewith. In this manner, multiple sets of instructions for various media units may be included within the same bulk configuration file.

Block 104 relates to transporting the bulk configuration file to one or more media units. The file may be transported from the network element, such as the NPU or other network communicable item. The bulk configuration file may be transported on a periodic basis or as specified by the network element, such as to support new media units, and/or as requested by the media units.

For example, the media units may be configured to search for the bulk configuration file upon initial start-up and/or on a periodic basis. The bulk configuration file may be continuously and/or periodically transmitted to support this operation. Likewise, the media units may be configured to request transport of the bulk configuration file from the network element, which may be advantageous with IP-based systems.

Block 106 relates to parsing the bulk configuration file. As described above, the bulk configuration file may include multiple sets of instructions, which may be associated with indicators or other identifiers. The media units may be configured to parse instructions associated with a particular indicator. For example, the media units may be delivered from the associated vendors with a built-in identifier and/or assigned a particular identifier by the network element or technician associated with installing the media element.

The parsed instructions may then be used by the media unit for self-configuration. The present invention contemplates any number of configurations and features for facilitating parsing the configuration instructions, including a lookup table wherein the instructions are cross-referenced with the indicators so as to permit the media unit to simply locate the indicators and to retrieve the instructions associated therewith.

Block 108 relates to configuring the operation parameters of the media units as function of the parsed instructions. This may include the media unit rebooting or otherwise manipulating a configuration profile or other feature associated with controlling the operation thereof. For example, based on the media unit's parsing of the configuration file, the media unit may self-configure access controls for remote management, it may self-configure event logging settings, or it may otherwise be directed to execute one or more of a pre-specified set of supported commands.

In more detail, the bulk configuration file may include instructions for event logging and other management applications. For example, the configuration file may specify a number of events for which the media is to log data for subsequent retrieval. This information may then be retrieved from the media unit through SNMP or other communication protocols and used for managing, monitoring, or otherwise obtaining information associated with the operation of the media element.

In addition to logging data, the event logging instructions may specify specific executable operation that may be performed upon occurrence of certain events. For example, the instructions may specify automatically transporting the logged data to the network element, such as on a periodic basis to support operational analysis. Alternatively, the instructions may specify procedures for compiling the logged data into a message for subsequent transport to the network element. Of course, any number of other operations may be specified for execution, which may be useful in subsequently programming or re-programming the media unit, especially if disruptions in service or other operating flaws are determined.

Block 110 relates to updating the bulk configuration file and the media units as a function thereof. The bulk configuration file may be periodically updated to support new media units and/or to support operation changes thereto. This may include notifying the media units to check for updates and/or programming the media units to parse the bulk configuration file on a regular or semi-regular basis. Optionally, the media units may be configured to automatically compare the instructions within the bulk configuration file against their own configurations settings so as to determine if any changes have occurred. If there are changes, the media units may self-configure, and if there are no change, the media unit may continue operation without unnecessarily executing the self-configuration process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of configuring settop boxes (STBs) used to support cable television services for a single cable television service provider, the method comprising:

providing a single bulk configuration file having multiple sets of instructions suitable for configuring the STBs, wherein the bulk configuration file includes instructions for configuring STBs associated with at least two different STB vendors, wherein the bulk configuration file includes instructions for configuring each of the STBs according to different configuration requirements associated therewith;

transporting the bulk configuration file from the cable television service provider to the STBs for use in configuring the STBs such that portions of the bulk configuration file are used to configure STBs from different STB vendors; and associating the instructions within the bulk configuration file with indicators associated with the different STB configuration requirements, and configuring the STBs to parse the instructions of the bulk configuration file as a function of the indicators included therein and without decrypting any portion of the bulk configuration file.

2. The method of claim 1 further comprising configuring the STBs to request the bulk configuration file from the cable television service provider and to self-configure upon receipt of the configuration file.

3. The method of claim 1 further comprising configuring the STBs to only self-configure as a function of the parsed configuration instructions.

4. The method of claim 1 further comprising including identifiers on the STBs for use in parsing the instructions.

5. The method of claim 1 further comprising including event logging instructions within the bulk configuration file, the event logging instructions including parameters associated with logging data as a function of STB events.

6. The method of claim 5 further comprising instructing the STBs to transmit the logged data to the network element.

7. The method of claim 1 further comprising including instructions for configuring remote management of the STBs.

8. A method of configuring media units used to support various services from a single cable television service provider, the method comprising:

providing a single unencrypted bulk configuration file having multiple sets of instructions suitable for configuring the media units, wherein the bulk configuration file includes instructions for configuring STBs associated with at least two different media unit vendors, wherein the bulk configuration file includes instructions for configuring each of the media units according to different configuration requirements associated therewith; and transporting the unencrypted bulk configuration file to the media units over a closed network associated with the service provider for use in configuring the media units such that portions of the bulk configuration file are used to configure media units from different media unit vendors and the bulk configuration file is transported to the media units in an unencrypted state whereby the media units process the bulk configuration file without performing decryption and security for the bulk configuration file is provided by the closed network.

9. The method of claim 8 further comprising configuring the media units to request the bulk configuration file from the service provider and to self-configure upon receipt of the configuration file.

10. The method of claim 8 further comprising associating the instructions within the bulk configuration file with indicators associated with the different configuration requirements, and configuring the media units to parse the instructions of the bulk configuration file as a function of the indicators included therein and without decrypting any portion of the bulk configuration file.

11. The method of claim 10 further comprising configuring the media units to only self-configure as a function of the parsed configuration instructions.

12. The method of claim 10 further comprising including identifiers on the media units for use in parsing the instructions.

13. The method of claim 8 further comprising periodically broadcasting the bulk configuration file to the media units and including instructions therein to configure the media units to periodically check for updates to the bulk configuration file.

14. The method of claim 8 further comprising including instructions within the bulk configuration file to facilitate remote control of the media units.

15. The method of claim 8 wherein the media units are settop boxes (STBs) associated with supporting cable television services and the method further comprising transporting the bulk configuration file over the closed network through out-of-band, one-way communications with the STBs.

16. An electronic system of providing electronic services to customers, the services being provided over a cable television network and with the assistance of a number of settop boxes (STBs), the system comprising:

an unencrypted bulk configuration file having instructions for configuring the STBs, wherein the bulk configuration file includes instructions for configuring each of the STBs according to different configuration requirements associated with a vendor thereof, wherein the bulk configuration file includes instructions for at least two different vendors;

a network element configured to communicate with the STBs over a closed network, wherein the network element transports the bulk configuration file to the STBs for use in configuring the STBs such that portions of the bulk configuration file are used to configure STBs from different STB vendors and the bulk configuration file is transported to the STBs in an unencrypted state whereby the STBs process the bulk configuration file without performing decryption and security for the bulk configuration file is provided by the closed network; and wherein the network element is configured to transmit an unencrypted updated bulk configuration file to the STBs, the updated bulk configuration file including updated instructions for at least one of the STBs to be updated and the same instructions as the bulk configuration for STBs not to be updated, wherein the STBs are configured to compare the portion of the bulk configuration file associated therewith to determine changes in the bulk configuration file, whereby only the STBs associated with the changes are updated through subsequent self-configuration based on the updated bulk configuration file.

17. The system of claim 16 wherein at least a portion of the settop boxes (STBs) receive the bulk configuration file through out-of-bound, one-way messaging.

18. The system of claim 17 wherein the network element is a network provisioning unit (NPU).

19. The system of claim 17 wherein the network element is configured to transport the bulk configuration file according to HTTP, DOCSIS, DSG, or TFTP protocols.

* * * * *